United States Patent
Luo et al.

(10) Patent No.: US 10,517,019 B2
(45) Date of Patent: Dec. 24, 2019

(54) RADIO RESOURCE OPTIMIZATION AND MANAGEMENT METHOD, CENTRALIZED CONTROLLER AND DEVICE

(71) Applicant: HUAWEI TECHNOLOGIES CO., LTD., Shenzhen (CN)

(72) Inventors: Zezhou Luo, Shenzhen (CN); Komarov Mikhail, Shenzhen (CN); Hongcheng Zhuang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 246 days.

(21) Appl. No.: 15/185,150

(22) Filed: Jun. 17, 2016

(65) Prior Publication Data

US 2016/0302108 A1 Oct. 13, 2016

Related U.S. Application Data

(63) Continuation of application No. PCT/CN2013/090140, filed on Dec. 20, 2013.

(51) Int. Cl.
*H04W 28/16* (2009.01)
*H04W 16/04* (2009.01)
(Continued)

(52) U.S. Cl.
CPC ........... *H04W 28/16* (2013.01); *H04W 16/04* (2013.01); *H04W 52/0206* (2013.01);
(Continued)

(58) Field of Classification Search
CPC .............................. H04W 16/04; H04W 28/16
See application file for complete search history.

(56) References Cited

U.S. PATENT DOCUMENTS

2007/0253385 A1* 11/2007 Li ................... H04W 16/06
370/338
2011/0103241 A1* 5/2011 Cho ................. H04L 5/0007
370/252
(Continued)

FOREIGN PATENT DOCUMENTS

| CN | 102238716 A | 11/2011 |
|---|---|---|
| CN | 103068011 A | 4/2013 |
| CN | 103404047 A | 11/2013 |

OTHER PUBLICATIONS

International Search Report dated Sep. 24, 2014, in corresponding International Application No. PCT/CN2013/090140.
(Continued)

*Primary Examiner* — Jason E Mattis
*Assistant Examiner* — Hong Shao
(74) *Attorney, Agent, or Firm* — Womble Bond Dickinson (US) LLP

(57) ABSTRACT

The present invention provides a radio resource optimization and management method, a centralized controller, and a base station. In the method, the centralized controller determines a work status series and a work policy series of each cell during a first time period; and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

20 Claims, 5 Drawing Sheets

(51) Int. Cl.
   *H04W 52/36*   (2009.01)
   *H04W 72/04*   (2009.01)
   *H04W 52/26*   (2009.01)
   *H04W 52/02*   (2009.01)
   *H04W 52/14*   (2009.01)

(52) U.S. Cl.
   CPC ....... *H04W 52/267* (2013.01); *H04W 52/367* (2013.01); *H04W 72/0453* (2013.01); *H04W 52/143* (2013.01); *Y02D 70/00* (2018.01)

(56) References Cited

U.S. PATENT DOCUMENTS

| | | | | |
|---|---|---|---|---|
| 2011/0249642 A1* | 10/2011 | Song | ................ | H04W 28/16 370/329 |
| 2012/0122513 A1* | 5/2012 | Yang | ................ | H04L 5/0035 455/522 |
| 2012/0196611 A1* | 8/2012 | Venkatraman | ...... | H04W 52/143 455/450 |
| 2013/0078925 A1* | 3/2013 | Aguirre | ................ | H04W 4/021 455/62 |
| 2013/0143541 A1* | 6/2013 | Henderson | ............ | H04W 16/24 455/418 |
| 2013/0203398 A1* | 8/2013 | Callard | ................ | H04W 88/08 455/418 |
| 2013/0315114 A1* | 11/2013 | Seo | ........................ | H04L 5/001 370/280 |
| 2014/0198766 A1* | 7/2014 | Siomina | .............. | H04W 72/082 370/330 |
| 2015/0065108 A1* | 3/2015 | Bedekar | ................ | H04W 24/02 455/418 |
| 2015/0078161 A1* | 3/2015 | Elsherif | ................ | H04W 16/04 370/235 |
| 2015/0119053 A1* | 4/2015 | Morimoto | ............ | H04W 16/08 455/450 |
| 2016/0021621 A1* | 1/2016 | Wu | ..................... | H04W 52/244 370/311 |
| 2016/0295418 A1* | 10/2016 | Yilmaz | ................. | H04W 16/32 |

OTHER PUBLICATIONS

International Search Report and Written Opinion dated Sep. 24, 2014 in corresponding International Patent Application No. PCT/CN2013/090140.

* cited by examiner

RADIO RESOURCE OPTIMIZATION AND MANAGEMENT METHOD, CENTRALIZED CONTROLLER AND DEVICE

CROSS-REFERENCE TO RELATED APPLICATIONS

This application is a continuation of International Application No. PCT/CN2013/090140, filed on Dec. 20, 2013, which is hereby incorporated by reference in its entirety.

TECHNICAL FIELD

The present invention relates to the communications field, and in particular, to a radio resource optimization and management method, a centralized controller and a device.

BACKGROUND

As a basic function of a radio access network, radio resource management uses a spectrum resource by means of scheduling, power control, and the like to provide a user with network access and signal transmission services. In a traditional cellular network, spectrums are divided and used on a per-cell basis. A specific quantity of spectrum resources are allocated to each cell, and the cell serves a user of the cell by using a combination of a spectrum and power. The cell determines how to use a particular part of spectrum resources and a specific power level at which the spectrum resources are used, which is a radio resource management (Radio Resource Management, RRM) function of the cell. The RRM on a per-cell basis has many disadvantages such as inability to coordinate shared resources and relatively low performance for users at a cell edge.

Therefore, some technologies for RRM coordination between cells emerge, which use neighboring cell information to coordinate the use of spectrum resources, so as to improve utilization and service quality. The coordination may be distributed or centralized. By coordinating the use of radio resources in related cells, resource utilization is increased, and cell edge performance is improved. The centralized cell coordination performs coordination between cells from an entire network perspective, and can achieve optimal performance of an entire network. However, due to a limitation on performance of a connection between a cell and a centralized control point, such as backhaul bandwidth and asynchronous measurement and reporting, it is generally difficult to achieve an ideal optimization effect. The distributed cell coordination determines a coordination relationship and a coordination process by means of information exchange between cells, and can adapt to fast network environment changes. However, due to a limitation on a technology of exchanging coordination information between cells, it is generally difficult to achieve optimal performance of the entire network.

SUMMARY

The purpose of the present invention is to provide a radio resource optimization and management method, so as to resolve a problem about how to implement high-performance radio resource optimization and management.

According to a first aspect, a radio resource optimization and management method is provided, where the method includes:

determining a work status series and a work policy series of each cell during a first time period; and sending the work status series and the work policy series of each cell to each cell, so that each cell adjusts resources of this cell according to the work status series and the work policy series, where duration of each work status is a second time period, and a sum of all the second time periods is the first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

With reference to the first aspect, in a first possible implementation manner of the first aspect, before the determining a work status series and a work policy series of each cell during a first time period, the method further includes:

receiving first information sent by each cell, where the first information includes at least location information of each cell; where the determining a work status series and a work policy series of each cell during a first time period includes:

grouping all cells according to the first information so that a quantity of groups is minimal and interference caused by a cell to another cell in a same group is minimal; and determining, on a per-group basis, a work status and a work policy of each group during each second time period so that average interference received by all cells during the first time period is minimal and a minimum transmission requirement of each cell during the first time period is met.

With reference to the first aspect or the first possible implementation manner of the first aspect, in a second possible implementation manner of the first aspect, during each second time period, a work status of only one group is an active state.

According to a second aspect, a radio resource optimization and management method is provided, where the method includes:

receiving a work status series and a work policy series sent by a centralized controller; and adjusting a transmit power upper threshold of a cell according to the work status series and the work policy series, where an adjustment period is a third period, duration of each work status is a second time period, a sum of all the second time periods is the first time period, and a sum of the adjustment periods is the second time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

With reference to the second aspect, in a first possible implementation manner of the second aspect, the adjusting a transmit power upper threshold of a cell according to the work status series and the work policy series includes:

acquiring an actual transmitted data volume during the previous second time period when the cell is in the passive state;

increasing the transmit power upper threshold of the cell if the actual transmitted data volume during the second time period is less than a minimum transmission requirement in the second time period; and decreasing the transmit power upper threshold of the cell if the actual transmitted data volume is greater than the minimum transmission requirement, where the transmit power upper threshold is adjusted per frequency subband, and power upper thresholds of different frequency subbands are adjusted independently of each other.

With reference to the first possible implementation manner of the second aspect, in a second possible implementation manner of the second aspect, the increasing the transmit power upper threshold of the cell includes:

for each frequency subband, a step size of adjusting the transmit power upper threshold is a penalty factor multiplied by an absolute value of a difference between the actual transmitted data volume and the minimum transmission requirement, where the penalty factor indicates impact on data transmission in a case in which each frequency subband does not meet a minimum transmission requirement of each subband.

With reference to the first possible implementation manner of the second aspect, in a third possible implementation manner of the second aspect, the decreasing the transmit power upper threshold of the cell includes:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

With reference to the first possible implementation manner of the second aspect or the second possible implementation manner of the second aspect or the third possible implementation manner of the second aspect, in a fourth possible implementation manner of the second aspect, after the acquiring an actual transmitted data volume during the previous second time period when the cell is in the passive state, the method further includes:

determining whether the actual transmitted data volume during the second time period is less than the minimum transmission requirement during the second time period; and the determining whether the actual transmitted data volume during the second time period is less than the minimum transmission requirement during the second time period includes:

subtracting the minimum transmission requirement from the actual transmitted data volume during the second time period to acquire a difference;

acquiring a first weight value according to the difference and a preset weight;

when the first weight value is greater than zero, determining whether the actual transmitted data volume during the second time period is greater than the minimum transmission requirement during the second time period; and when the first weight value is less than zero, determining whether the actual transmitted data volume during the second time period is less than the minimum transmission requirement during the second time period.

With reference to the second aspect, in a fifth possible implementation manner of the second aspect, the adjusting a transmit power upper threshold of a cell according to the work status series and the work policy series includes:

when the cell is in the active state, acquiring a difference between an actual transmitted data volume of all cells during a previous second time period and a minimum transmission requirement of all cells during the second time period;

increasing the transmit power upper threshold of the cell when the actual transmitted data volume of all cells during the second time period is greater than the minimum transmission requirement of all cells during the second time period; and decreasing the transmit power upper threshold of the cell when the actual transmitted data volume of all cells during the second time period is less than the minimum transmission requirement of all cells during the second time period, where the transmit power upper threshold is adjusted per frequency subband, and power upper thresholds of different frequency subbands are adjusted independently of each other.

With reference to the fifth possible implementation manner of the second aspect, in a sixth possible implementation manner of the second aspect, the decreasing the transmit power upper threshold of the cell includes:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

With reference to the fifth possible implementation manner of the second aspect, in a seventh possible implementation manner of the second aspect, the increasing the transmit power upper threshold of the cell includes:

for each frequency subband, a step size of adjusting the transmit power upper threshold is a penalty factor multiplied by a sum of differences between an actual transmitted data volume of all cells and the minimum transmission requirement of all cells during the second time period, where the penalty factor indicates impact on data transmission in a case in which each frequency subband is greater than a minimum transmission requirement of each subband.

With reference to the fifth possible implementation manner of the second aspect or the sixth possible implementation manner of the second aspect or the seventh possible implementation manner of the second aspect, in an eighth possible implementation manner of the second aspect, after the acquiring the sum of differences between the actual transmitted data volume of all cells during the previous second time period and the minimum transmission requirement of all cells during the second time period, the method further includes:

determining whether the actual transmitted data volume of all cells during the second time period is greater than the minimum transmission requirement of all cells during the second time period; and the determining whether the actual transmitted data volume of all cells during the second time period is greater than the minimum transmission requirement of all cells during the second time period includes:

multiplying the sum of differences by a preset weight to acquire a second weight value;

if the second weight value is greater than zero, determining whether the actual transmitted data volume of all cells during the second time period is greater than the minimum transmission requirement of all cells during the second time period; and if the second weight value is less than zero, determining whether the actual transmitted data volume of all cells during the second time period is less than the minimum transmission requirement of all cells during the second time period.

According to a third aspect, a centralized controller is provided, where the centralized controller includes:

a determining unit, configured to determine a work status series and a work policy series of each cell during a first time period; and a sending unit, configured to send the work status series and the work policy series of each cell to each cell, so that each cell adjusts resources of this cell according to the work status series and the work policy series, where duration of each work status is a second time period, and a sum of all the second time periods is the first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

With reference to the third aspect, in a first possible implementation manner of the third aspect, the centralized controller further includes:

a receiving unit, configured to receive first information sent by each cell, where the first information includes at least location information of each cell; where the determining unit is specifically configured to:

group all cells according to the first information so that a quantity of groups is minimal and interference caused by a cell to another cell in a same group is minimal; and determine, on a per-group basis, a work status and a work policy of each group during each second time period so that average interference received by all cells during the first time period is minimal and a minimum transmission requirement of each cell during the first time period is met.

With reference to the third aspect or the first possible implementation manner of the third aspect, in a second possible implementation manner of the third aspect, during each second time period, a work status of only one group is an active state.

According to a fourth aspect, a base station is provided, where the base station includes:

a receiving unit, configured to receive a work status series and a work policy series sent by a centralized controller; and an adjusting unit, configured to adjust a transmit power upper threshold of a cell according to the work status series and the work policy series, where an adjustment period is a third period, duration of each work status is a second time period, a sum of all the second time periods is the first time period, and a sum of the adjustment periods is the second time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

With reference to the fourth aspect, in a first possible implementation manner of the fourth aspect, the adjusting unit is specifically configured to:

acquire an actual transmitted data volume during the previous second time period when the cell is in the passive state;

increase the transmit power upper threshold of the cell if the actual transmitted data volume during the second time period is less than a minimum transmission requirement during the second time period; and decrease the transmit power upper threshold of the cell if the actual transmitted data volume is greater than the minimum transmission requirement, where the transmit power upper threshold is adjusted per frequency subband, and power upper thresholds of different frequency subbands are adjusted independently of each other.

With reference to the first possible implementation manner of the fourth aspect, in a second possible implementation manner of the fourth aspect, the increasing the transmit power upper threshold of the cell executed in the adjusting unit includes:

for each frequency subband, a step size of adjusting the transmit power upper threshold is a penalty factor multiplied by an absolute value of a difference between the actual transmitted data volume and the minimum transmission requirement, where the penalty factor indicates impact on data transmission in a case in which each frequency subband does not meet a minimum transmission requirement of each subband.

With reference to the first possible implementation manner of the fourth aspect, in a third possible implementation manner of the fourth aspect, the decreasing the transmit power upper threshold of the cell executed in the adjusting unit includes:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

With reference to the first possible implementation manner of the fourth aspect or the second possible implementation manner of the fourth aspect or the third possible implementation manner of the fourth aspect, in a fourth possible implementation manner of the fourth aspect, the base station further includes:

a judging unit, configured to determine whether the actual transmitted data volume during the second time period is less than the minimum transmission requirement during the second time period; where the judging unit is specifically configured to:

subtract the minimum transmission requirement from the actual transmitted data volume during the second time period to acquire a difference;

acquire a first weight value according to the difference and a preset weight;

when the first weight value is greater than zero, determine whether the actual transmitted data volume during the second time period is greater than the minimum transmission requirement during the second time period; and when the first weight value is less than zero, determine whether the actual transmitted data volume during the second time period is less than the minimum transmission requirement during the second time period.

With reference to the fourth aspect, in a fifth possible implementation manner of the fourth aspect, the adjusting unit is specifically configured to:

when the cell is in the active state, acquire a difference between an actual transmitted data volume of all cells during a previous second time period and a minimum transmission requirement of all cells during the second time period;

increase the transmit power upper threshold of the cell when the actual transmitted data volume of all cells during the second time period is greater than the minimum transmission requirement of all cells during the second time period; and decrease the transmit power upper threshold of the cell when the actual transmitted data volume of all cells during the second time period is less than the minimum transmission requirement of all cells during the second time period, where the transmit power upper threshold is adjusted per frequency subband, and power upper thresholds of different frequency subbands are adjusted independently of each other.

With reference to the fifth possible implementation manner of the fourth aspect, in a sixth possible implementation manner of the fourth aspect, the decreasing the transmit power upper threshold of the cell executed in the adjusting unit includes:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

With reference to the fifth possible implementation manner of the fourth aspect, in a seventh possible implementation manner of the fourth aspect, the increasing the transmit power upper threshold of the cell executed in the adjusting unit includes:

for each frequency subband, a step size of adjusting the transmit power upper threshold is a penalty factor multiplied by a sum of differences between an actual transmitted data volume of all cells and the minimum transmission requirement of all cells during the second time period, where the penalty factor indicates impact on data transmission in a case in which each frequency subband is greater than a minimum transmission requirement of each subband.

With reference to the fifth possible implementation manner of the fourth aspect or the sixth possible implementation manner of the fourth aspect or the seventh possible implementation manner of the fourth aspect, in an eighth possible implementation manner of the fourth aspect, the base station further includes a judging unit, where the judging unit is configured to:

determine whether the actual transmitted data volume of all cells during the second time period is greater than the minimum transmission requirement of all cells during the second time period; and the judging unit is specifically configured for:

the determining whether the actual transmitted data volume of all cells during the second time period is greater than the minimum transmission requirement of all cells during the second time period includes:

multiplying the sum of differences by a preset weight to acquire a second weight value;

if the second weight value is greater than zero, determining whether the actual transmitted data volume of all cells during the second time period is greater than the minimum transmission requirement of all cells during the second time period; and if the second weight value is less than zero, determining whether the actual transmitted data volume of all cells during the second time period is less than the minimum transmission requirement of all cells during the second time period.

The embodiments of the present invention provide the radio resource optimization and management method, the centralized controller, and the base station. In the method, the centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The following descriptions are merely exemplary embodiments of the present invention, but are not intended to limit the present invention. Any modification, equivalent replacement, or improvement made without departing from the spirit and principle of the present invention shall fall within the protection scope of the present invention.

Figure 1:
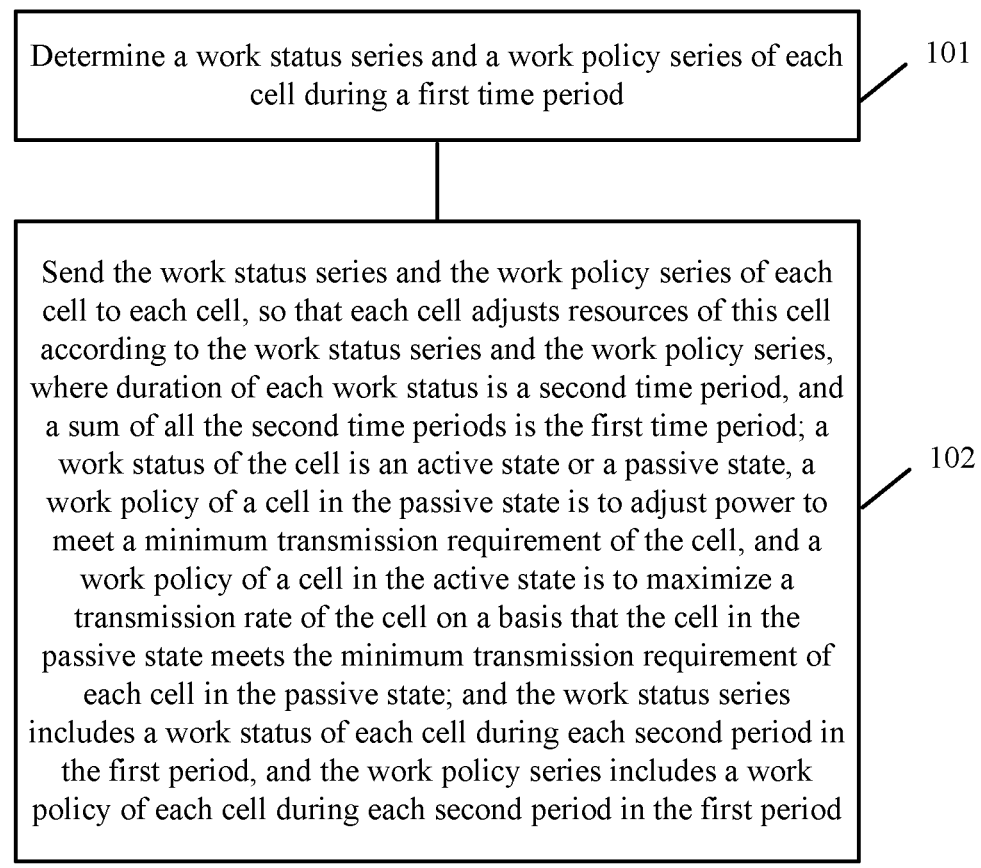
FIG. 1 is a flowchart of a radio resource optimization and management method according to an embodiment of the present invention.

Referring to FIG. 1, FIG. 1 is a flowchart of a radio resource optimization and management method according to an embodiment of the present invention. As shown in FIG. 1, the method includes:

Step 101: Determine a work status series and a work policy series of each cell during a first time period.

Duration of each work status is a second time period, and a sum of all the second time periods is the first time period.

A work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state.

The work status series includes a work status of each cell during each second time period in the first time period, and the work policy series includes a work policy of each cell during each second time period in the first time period.

For the second time period of each cell, the work status series may be the same or different between any two cells.

Optionally, before the determining a work status series and a work policy series of each cell during a first time period, the method further includes:

receiving first information sent by each cell, where the first information includes at least location information of each cell; where the determining a work status series and a work policy series of each cell during a first time period includes:

grouping all cells according to the first information so that a quantity of groups is minimal and interference caused by a cell to another cell in a same group is minimal; and determining, on a per-group basis, a work status and a work policy of each group during each second time period so that average interference received by all cells during the first time period is minimal and a minimum transmission requirement of each cell during the first time period is met.

Optionally, during each second time period, a work status of only one group is an active state.

Specifically, inter-cell interference decreases with an increase of a distance. Use of radio resources is irrelevant between two cells that are physically far apart. Conversely, use of radio resources needs to be coordinated between two close cells to maximize efficiency. A purpose of cell grouping is to minimize mutual interference between cells in each group and ensure a minimal quantity of groups. Problem description of cell grouping may come in many forms, and one of the forms is represented by a graph (graph). A monotonically increase relationship exists between an inter-cell interference strength and an inter-cell distance, and the inter-cell distance represents the inter-cell interference. A geometric center of a cell is referred to as a vertex. A distance between two vertexes exceeds a preset threshold d and the two vertexes are connected by a straight line, and the vertexes and a connection line between the vertexes form a graph. A subgraph is found in the graph, where the subgraph meets the following characteristics:

A connection line exists between every two of all vertexes in the subgraph; and a size of the subgraph is the largest, namely, there is no other subgraph that includes all vertexes and connection lines of the subgraph and has more vertexes and connection lines than the subgraph.

Specific steps of cell grouping are as follows:

Step 1: Geometric centers of all cells form a vertex set.

Step 2: Try different quantities of groups, and calculate a circle length of each quantity of groups. Vertex connection lines in a same group form a circle, and the circle length is defined as a sum of lengths of vertex connection lines.

Step 3: A grouping manner corresponding to a maximal circle length is an optimal grouping manner.

After cell grouping is complete, interference between different cells in a same group may be ignored. Therefore, a same coordination state may be used at a same time point, and cells in different groups need to use different coordination states to obtain more coordination gains. A purpose of cell scheduling is to determine a time-varying sequence of the coordination state of each cell. Because the cells in the same group have the same coordination state, cell scheduling is actually performed on a per-group basis. The cell scheduling aims to minimize inter-cell interference by means of minimizing the interference time and quantity of cells that interference with each other, and ensure that each cell has sufficient opportunities to maximize a local utility function of this cell. A decision-making problem of cell scheduling optimization may be described by an expression (1).

$$\begin{cases} x = \text{argmax} \sum_{n=1}^{N} \sum_{k=1}^{K} \sum_{j=1}^{N_j} x(k, j) D(j, n), \\ \sum_{j=1}^{N_j} x(k, j) = 1, \forall k = 1:K, \\ \sum_{k=1}^{K} \sum_{j=1}^{N_j} x(k, j) \cdot z(j, n) \geq b(n), n = 1:N. \end{cases} \quad (1)$$

where Nj is a quantity of groups; D(j,n) is an average distance from a cell n to all cells of a group j; x(k,j) is an indicator variable, where a value 1 indicates that a coordination state of the group j during a time period k is an active state, and a value 0 indicates a passive state; z(j,n) is an indicator variable, whose value is 1 when the cell n belongs to the group j and is 0 when the cell n does not belong to the group j; and b(n) indicates a minimum number of times the cell n is in the active state in this optimization process (a time period of T1), and a value of b(n) depends on a service requirement of the cell n during the time period.

In the expression (1), $$x = \mathrm{argmax} \sum_{n=1}^{N} \sum_{k=1}^{K} \sum_{j=1}^{N_j} x(k, j) D(j, n)$$

indicates that mutual interference between cells in each group is minimal because a greater distance indicates less interference to another cell;

$$\sum_{j=1}^{N_j} x(k, j) = 1, \forall\, k = 1{:}K$$

indicates that a work status of only one group is an active state during each second time period; and $$\sum_{k=1}^{K} \sum_{j=1}^{N_j} x(k, j) \cdot z(j, n) \geq b(n),\ n = 1{:}N.$$

indicates that each cell meets a minimum service requirement.

The expression (1) is used to determine, on a per-group basis, the work status series and the work policy series of each cell after cell grouping. The optimization problem described by the expression (1) is an integer programming problem (integer programming problem). Currently, multiple relatively mature solutions are already available. Although a computing complexity is relatively large, after the problem is resolved, no update is required in a relatively long time until a network status changes, for example, service distribution changes (namely, b(n)).

By resolving the optimization problem in the expression (1), a coordination state sequence of each cell during a current network optimization period of T1 may be obtained. Such information is delivered to each cell, and each cell adjusts its own coordination state periodically (during a period of T2) according to the sequence, and invokes a corresponding distributed optimization algorithm to adjust a power upper threshold in a radio resource management (Radio Resource Management, RRM) parameter of this cell.

Step 102: Send the work status series and the work policy series of each cell to each cell, so that each cell adjusts resources of this cell according to the work status series and the work policy series.

This embodiment of the present invention provides the radio resource optimization and management method. In the method, a centralized controller determines a work status series and a work policy series of each cell during a first time period, and sends the work status series and the work policy series of each cell to each cell, so that each cell adjusts resources of this cell according to the work status series and the work policy series. A total transmission quantity of an entire network is enhanced on a precondition that a minimum transmission requirement of a cell is met, thereby enhancing a network KPI at a large time granularity by means of distributed cell coordination while ensuring local key performance indicator (Key Performance Indicator, KPI) performance of each cell, where ensuring local key performance indicator performance of each cell means meeting the minimum transmission requirement of the cell. In contrast with distributed coordination optimization in a single coordination state, the present invention provides a higher degree of freedom in terms of a time dimension, and therefore provides better performance in terms of a network KPI at a large time granularity.

Figure 2:
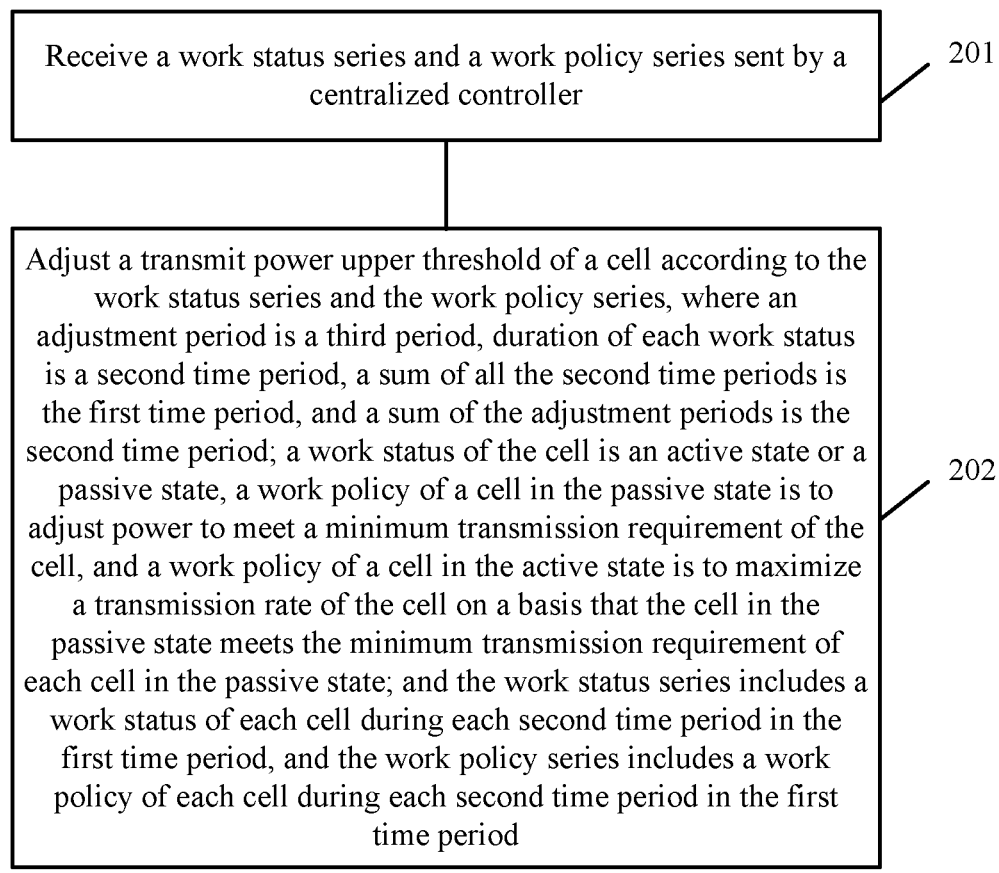
FIG. 2 is a flowchart of a radio resource optimization and management method according to an embodiment of the present invention.

Referring to FIG. 2, FIG. 2 is a flowchart of a radio resource optimization and management method according to an embodiment of the present invention. The method includes the following steps:

Step 201: Receive a work status series and a work policy series sent by a centralized controller.

Step 202: Adjust a transmit power upper threshold of a cell according to the work status series and the work policy series.

An adjustment period is a third period, duration of each work status is a second time period, a sum of all the second time periods is the first time period, and a sum of the adjustment periods is the second time period.

A work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state.

The work status series includes a work status of each cell during each second time period in the first time period, and the work policy series includes a work policy of each cell during each second time period in the first time period.

Optionally, the adjusting a transmit power upper threshold of a cell according to the work status series and the work policy series includes:

acquiring an actual transmitted data volume during the previous second time period when the cell is in the passive state;

increasing the transmit power upper threshold of the cell if the actual transmitted data volume during the second time period is less than a minimum transmission requirement during the second time period; and decreasing the transmit power upper threshold of the cell if the actual transmitted data volume is greater than the minimum transmission requirement, where the transmit power upper threshold is adjusted per frequency subband, and power upper thresholds of different frequency subbands are adjusted independently of each other.

The increasing the transmit power upper threshold of the cell includes:

for each frequency subband, a step size of adjusting the transmit power upper threshold is a penalty factor multiplied by an absolute value of a difference between the actual transmitted data volume and the minimum transmission requirement, where the penalty factor indicates impact on data transmission in a case in which each frequency subband does not meet a minimum transmission requirement of each subband.

The decreasing the transmit power upper threshold of the cell includes:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

Optionally, after the acquiring an actual transmitted data volume during the previous second time period when the cell is in the passive state, the method further includes:

determining whether the actual transmitted data volume during the second time period is less than the minimum transmission requirement during the second time period; and the determining whether the actual transmitted data volume during the second time period is less than the minimum transmission requirement during the second time period includes:

subtracting the minimum transmission requirement from the actual transmitted data volume during the second time period to acquire a difference;

acquiring a first weight value according to the difference and a preset weight;

when the first weight value is greater than zero, determining whether the actual transmitted data volume during the second time period is greater than the minimum transmission requirement during the second time period; and when the first weight value is less than zero, determining whether the actual transmitted data volume during the second time period is less than the minimum transmission requirement during the second time period.

Specifically, reference may be made to the following implementation manner:

Calculate a transmitted data volume V(t,n) of this cell during a current period of T2 (T2 indicates the second time period, and n is a sequence number of a cell).

Compare the transmitted data volume V with a minimum transmission quantity C.

Q=(C(t,n)−V(t,n))*W−;//(W is a weighting coefficient, indicating a weight of this cell in all cells).

Calculate a step size of power adjustment.

H=Q*F (F is a penalty factor, indicating impact on data transmission in a case in which each frequency subband does not meet a minimum transmission requirement of each subband).

Update a power setting (power upper threshold).
if H>0
P(t,n,:)=water_filling(P(t,n,:),H);
else
z=P(t,n,:)/sum(P(t,n,:));
P(t,n,:)=P(t,n,:)+H*z;
end Check whether the updated power setting is in a permitted range.
P(t,n,:)=max(P(t,n,:), 0);
S=sum(P(t,n,:));
if S>Pmax
P(t,n,:)=Pmax*P(t,n,:)/S;
end where water_filling(P(t,n,:),H) is generally referred to as a "water filling algorithm" In this case, H>0 indicates that the minimum transmission quantity is not completed. This function indicates that in a case in which data of an amount H is not completed, if power of each subband in this cell is increased to meet a requirement for completing the minimum transmission quantity, the power needs to be increased. P(t,n,s) indicates a power upper threshold, namely, power upper threshold, of a cell n in the $s^{th}$ subband at a time point t. Generally the power upper threshold is on a per-subband basis, that is, an operating band is divided into several subbands, and frequency resources in a same subband use a same power upper threshold; C(t,n) indicates a minimum transmitted data volume of the cell n at the time point t; and V(t,n) indicates an actual transmitted data volume of the cell n at the time point t.

Optionally, the adjusting a transmit power upper threshold of a cell according to the work status series and the work policy series includes:

when the cell is in the active state, acquiring a difference between an actual transmitted data volume of all cells during a previous second time period and a minimum transmission requirement of all cells during the second time period;

increasing the transmit power upper threshold of the cell when the actual transmitted data volume of all cells during the second time period is greater than the minimum transmission requirement of all cells during the second time period; and decreasing the transmit power upper threshold of the cell when the actual transmitted data volume of all cells during the second time period is less than the minimum transmission requirement of all cells during the second time period, where the transmit power upper threshold is adjusted per frequency subband, and power upper thresholds of different frequency subbands are adjusted independently of each other.

The decreasing the transmit power upper threshold of the cell includes:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

The increasing the transmit power upper threshold of the cell includes:

for each frequency subband, a step size of adjusting the transmit power upper threshold is a penalty factor multiplied by a sum of differences between an actual transmitted data volume of all cells and the minimum transmission requirement of all cells during the second time period, where the penalty factor indicates impact on data transmission in a case in which each frequency subband is greater than a minimum transmission requirement of each subband.

After the acquiring the sum of differences between the actual transmitted data volume of all cells during the previous second time period and the minimum transmission requirement of all cells during the second time period, the method further includes:

determining whether the actual transmitted data volume of all cells during the second time period is greater than the minimum transmission requirement of all cells during the second time period; and the determining whether the actual transmitted data volume of all cells during the second time period is greater than the minimum transmission requirement of all cells during the second time period includes:

multiplying the sum of differences by a preset weight to acquire a second weight value;

if the second weight value is greater than zero, determining whether the actual transmitted data volume of all cells during the second time period is greater than the minimum transmission requirement of all cells during the second time period; and if the second weight value is less than zero, determining whether the actual transmitted data volume of all cells during the second time period is less than the minimum transmission requirement of all cells during the second time period.

Specifically, reference may be made to the following implementation manner

Calculate a transmitted data volume V of all cells and a minimum transmission quantity C of all cells during a current period of T2.

Compare the transmitted data volume V with the minimum transmission quantity C.

D=W(n,:)*(C(t,:-)-V(t,:));//W is a weighting coefficient.

Calculate a step size of power adjustment.

H=D*F;

Update a power setting (power upper threshold).

if H>0 z=P(t,n,:)/sum(P(t,n,:));

P(t,n,:)=P(t,n,:)-H*z;

else

P(t,n,:)=water_filling(P(t,n,:),-H);

end

Check whether the updated power setting is in a permitted range.

P(t,n,:)=max(P(t,n,:), 0);

S=sum(P(t,n,:));

if S>Pmax

P(t,n,:)=Pmax*P(t,n,:)/S;

end where water_filling(P(t,n,:),-H) indicates that, in a case in which H is greater than 0, namely, when the actual transmitted data volume of all cells during the second time period is less than the minimum transmission requirement of all cells during the second time period, the transmit power upper threshold of this cell is decreased, so that another cell in a passive state meets the minimum transmission requirement, and so that a difference between the transmitted data volume and the minimum transmission requirement tends to be consistent between the subbands.

This embodiment of the present invention provides the radio resource optimization and management method. In the method, a centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

Figure 3:
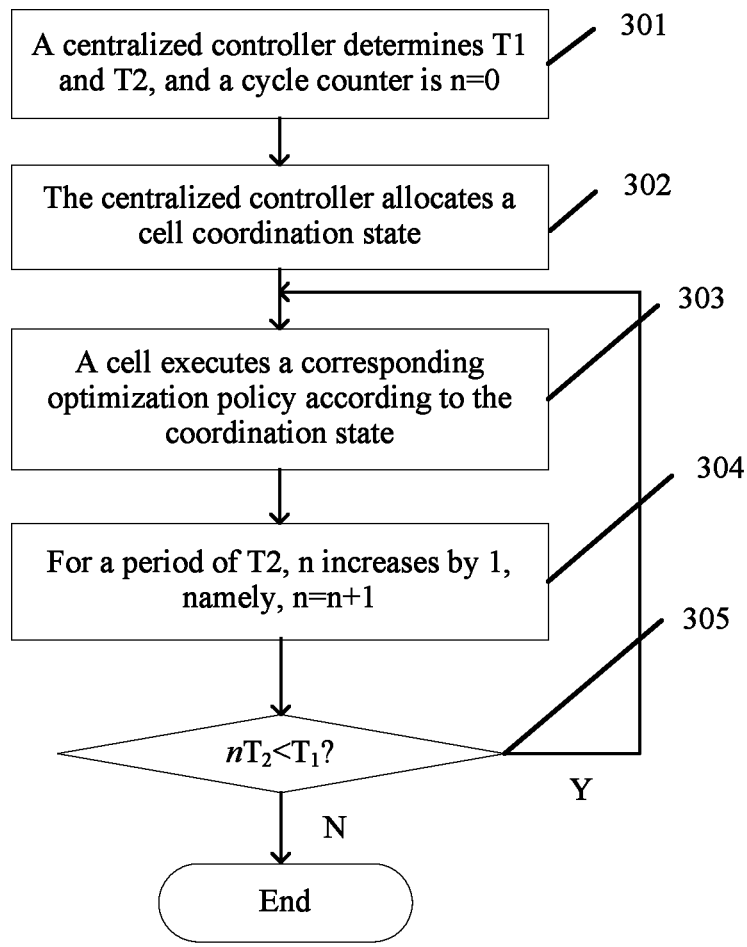
FIG. 3 is a flowchart of a radio resource optimization and management method according to an embodiment of the present invention.

FIG. 3 is a flowchart of a radio resource optimization and management method according to an embodiment of the present invention. As shown in FIG. 3, the method includes the following steps:

Step 301: A centralized controller determines T1 and T2, and a counter n is set to 0 (n=0).

Step 302: The centralized controller allocates a cell coordination state.

Step 303: A cell executes an optimization policy corresponding to each coordination state according to the coordination state.

Step 304: Use a period of T2 as a time unit. For every period of T2, n increases by 1, namely, n=n+1.

Step 305: Determine whether nT2 is less than T1.

If nT2 is less than T1, return to perform step 303.

If nT2 is not less than T1, the method ends.

According to a centralized cell scheduling result, each cell may obtain its coordination state information, namely, a coordination state of the cell at any time point during a network optimization period of T1. A change period of the cell coordination state (distributed coordination optimization period) is T2(=T1/K). According to its coordination state, the cell uses a corresponding distributed optimization algorithm to adjust the power upper threshold of this cell, thereby ensuring performance of this cell and optimizing a global network KPI.

A basic principle of the distributed coordination optimization is that each cell has a minimum requirement for a transmitted data volume during the period of T2, when an actual transmitted data volume during a previous period of T2 exceeds the minimum requirement, a cell in an active state may increase its power to obtain a higher throughput, and a cell in a passive state may decrease power correspondingly to reduce interference to the cell in the active state. Conversely, if an actual transmission quantity is lower than the minimum requirement, the cell in the active state needs to decrease its power to reduce interference to the cell in the passive state, and the cell in the passive state increases the power correspondingly to meet the minimum requirement for a transmitted data volume.

At the end of each period of T2, the distributed optimization algorithm collects statistics on the transmitted data volume during the current period of T2 and the transmitted data volume of a neighboring cell (obtained by means of cell interaction), and calculates a power upper threshold used by this cell during a next period of T2. A procedure of optimizing an RRM parameter for distributed cell coordination is illustrated in FIG. 3.

This embodiment of the present invention provides the radio resource optimization and management method. In the method, a centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

Figure 4:
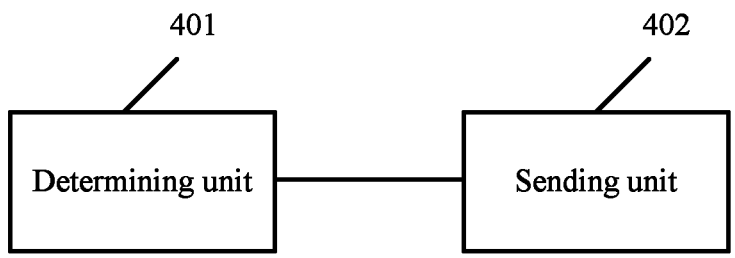
FIG. 4 is an apparatus structure diagram of a centralized controller according to an embodiment of the present invention.

Referring to FIG. 4, FIG. 4 is an apparatus structure diagram of a centralized controller according to an embodiment of the present invention. As shown in FIG. 4, the centralized controller includes a determining unit 401 and a sending unit 402.

The determining unit 401 is configured to determine a work status series and a work policy series of each cell during a first time period, where duration of each work status is a second time period, and a sum of all the second time periods is the first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

Optionally, the centralized controller further includes:

a receiving unit, configured to receive first information sent by each cell, where the first information includes at least location information of each cell; where the determining unit 401 is specifically configured to:

group all cells according to the first information so that a quantity of groups is minimal and interference caused by a cell to another cell in a same group is minimal; and determine, on a per-group basis, a work status and a work policy of each group during each second time period so that average interference received by all cells during the first time period is minimal and a minimum transmission requirement of each cell during the first time period is met.

During each second time period, a work status of only one group is an active state.

Specifically, inter-cell interference decreases with an increase of a distance. Use of radio resources is irrelevant between two cells that are physically far apart. Conversely, use of radio resources needs to be coordinated between two close cells to maximize efficiency. A purpose of cell grouping is to minimize mutual interference between cells in each group and ensure a minimal quantity of groups. Problem description of cell grouping may come in many forms, and one of the forms is a graph (graph). A monotonically increase relationship exists between an inter-cell interference strength and an inter-cell distance, and the inter-cell distance represents the inter-cell interference. A geometric center of a cell is referred to as a vertex. Two vertexes, a distance between which exceeds a preset threshold d, are connected by a straight line, and the vertexes and a connection line between the vertexes form a graph. A subgraph is found in the graph, where the subgraph meets the following characteristics:

A connection line exists between every two of all vertexes in the subgraph; and a size of the subgraph is the largest, namely, there is no subgraph that includes all vertexes and connection lines of the subgraph and has more vertexes and connection lines than the subgraph.

Specific steps of cell grouping are as follows:

Step 1: Geometric centers of all cells form a vertex set.

Step 2: Try different quantities of groups, and calculate a circle length of each quantity of groups. Vertex connection lines in a same group form a circle, and the circle length is defined as a sum of lengths of vertex connection lines.

Step 3: A grouping manner corresponding to a maximal circle length is an optimal grouping manner.

After cell grouping is complete, interference between different cells in a same group may be ignored. Therefore, a same coordination state may be used at a same time point, and cells in different groups need to use different coordination states to obtain more coordination gains. A purpose of cell scheduling is to determine a time-varying sequence of the coordination state of each cell. Because the cells in the same group have the same coordination state, cell scheduling is actually performed on a per-group basis. The cell scheduling aims to minimize inter-cell interference with respect to time and an average cell quantity, and ensure that each cell has sufficient opportunities to maximize a local utility function of this cell. A decision-making problem of cell scheduling optimization may be described by an expression (1).

$$\begin{cases} x = \operatorname{argmax} \sum_{n=1}^{N} \sum_{k=1}^{K} \sum_{j=1}^{N_j} x(k, j) D(j, n), \\ \sum_{j=1}^{N_j} x(k, j) = 1, \forall k = 1:K, \\ \sum_{k=1}^{K} \sum_{j=1}^{N_j} x(k, j) \cdot z(j, n) \geq b(n), n = 1:N. \end{cases} \quad (1)$$

where $N_j$ is a quantity of groups; $D(j,n)$ is an average distance from a cell n to all cells of a group j; $x(k,j)$ is an indicator variable, where a value 1 indicates that a coordination state of the group j during a time period k is an active state, and a value 0 indicates a passive state; $z(j,n)$ is an indicator variable, whose value is 1 when the cell n belongs to the group j and is 0 when the cell n does not belong to the group j; and $b(n)$ indicates a minimum number of times the cell n is in the active state in this optimization process (a time period of T1), and a value of $b(n)$ depends on a service requirement of the cell n during the time period.

In the expression (1), $$x = \operatorname{argmax} \sum_{n=1}^{N} \sum_{k=1}^{K} \sum_{j=1}^{N_j} x(k, j) D(j, n)$$

indicates that mutual interference between cells in each group is minimal because a greater distance indicates less interference to another cell;

$$\sum_{j=1}^{N_j} x(k, j) = 1, \forall k = 1:K$$

indicates that a work status of only one group is an active state during each second time period; and $$\sum_{k=1}^{K} \sum_{j=1}^{N_j} x(k, j) \cdot z(j, n) \geq b(n), n = 1:N.$$

indicates that each cell meets a minimum service requirement.

The expression (1) is used to determine, on a per-group basis, the work status series and the work policy series of each cell after cell grouping. The optimization problem described by the expression (1) is an integer programming problem (integer programming problem). Currently, multiple relatively mature solutions are already available. Although a computing amount is relatively large, after the problem is resolved, no more resolving is required in a relatively long time until a network status changes, for example, service distribution changes (namely, b(n)).

By resolving the optimization problem in the expression (1), a coordination state sequence of each cell during a current network optimization period of T1 may be obtained. Such information is delivered to each cell, and each cell adjusts its own coordination state periodically (during a period of T2) according to the sequence, and invokes a corresponding distributed optimization algorithm to adjust an RRM parameter (power upper threshold) of this cell.

The sending unit 402 is configured to send the work status series and the work policy series of each cell to each cell, so that each cell adjusts resources of this cell according to the work status series and the work policy series.

This embodiment of the present invention provides the centralized controller. The centralized controller determines a work status series and a work policy series of each cell during a first time period, and sends the work status series and the work policy series of each cell to each cell, so that each cell adjusts resources of this cell according to the work status series and the work policy series. A total transmission quantity of an entire network is enhanced on a precondition that a minimum transmission requirement of a cell is met, thereby enhancing a network KPI at a large time granularity by means of distributed cell coordination while ensuring local key performance indicator (Key Performance Indicator, KPI) performance of each cell, where ensuring local key performance indicator performance of each cell means meeting the minimum transmission requirement of the cell. In contrast with distributed coordination optimization in a single coordination state, the present invention provides a higher degree of freedom in terms of a time dimension, and therefore provides better performance in terms of a network KPI at a large time granularity.

Figure 5:
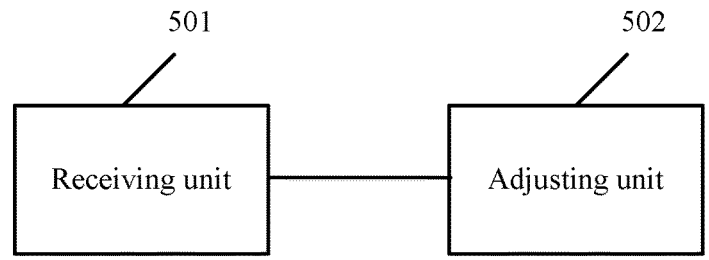
FIG. 5 is an apparatus structure diagram of a base station according to an embodiment of the present invention.

Referring to FIG. 5, FIG. 5 is an apparatus structure diagram of a base station according to an embodiment of the present invention. As shown in FIG. 5, the base station includes a receiving unit 501 and an adjusting unit 502.

The receiving unit 501 is configured to receive a work status series and a work policy series sent by a centralized controller, where an adjustment period is a third period, duration of each work status is a second time period, a sum of all the second time periods is the first time period, and a sum of the adjustment periods is the second time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

The adjusting unit 502 is configured to adjust a transmit power upper threshold of a cell according to the work status series and the work policy series.

Optionally, the adjusting unit 502 is specifically configured to:

acquire an actual transmitted data volume during the previous second time period when the cell is in the passive state;

increase the transmit power upper threshold of the cell if the actual transmitted data volume during the second time period is less than a minimum transmission requirement during the second time period; and decrease the transmit power upper threshold of the cell if the actual transmitted data volume is greater than the minimum transmission requirement, where the transmit power upper threshold is adjusted per frequency subband, and power upper thresholds of different frequency subbands are adjusted independently of each other.

Specifically, the increasing the transmit power upper threshold of the cell executed in the adjusting unit 502 includes:

for each frequency subband, a step size of adjusting the transmit power upper threshold is a penalty factor multiplied by an absolute value of a difference between the actual transmitted data volume and the minimum transmission requirement, where the penalty factor indicates impact on data transmission in a case in which each frequency subband does not meet a minimum transmission requirement of each subband.

Specifically, the decreasing the transmit power upper threshold of the cell executed in the adjusting unit 502 includes:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

In an embodiment, the base station further includes:

a judging unit, configured to determine whether the actual transmitted data volume during the second time period is less than the minimum transmission requirement during the second time period; where the judging unit is specifically configured to:

subtract the minimum transmission requirement from the actual transmitted data volume during the second time period to acquire a difference;

acquire a first weight value according to the difference and a preset weight;

when the first weight value is greater than zero, determine whether the actual transmitted data volume during the second time period is greater than the minimum transmission requirement during the second time period; and when the first weight value is less than zero, determine whether the actual transmitted data volume during the second time period is less than the minimum transmission requirement during the second time period.

Specifically, reference may be made to the following implementation manner

Calculate a transmitted data volume V(t,n) of this cell during a current period of T2 (T2 indicates the second time period, and n is a sequence number of a cell).

Compare the transmitted data volume V with a minimum transmission quantity C.

Q=(C(t,n)−V(t,n))*W−;//(W is a weighting coefficient, indicating a weight of this cell in all cells).

Calculate a step size of power adjustment.

H=Q*F (F is a penalty factor, indicating impact on data transmission in a case in which each frequency subband does not meet a minimum transmission requirement of each subband).

Update a power setting (power upper threshold).
if H>0
P(t,n,:)=water_filling(P(t,n,:),H);
else
z=P(t,n,:)/sum(P(t,n,:));
P(t,n,:)=P(t,n,:)+H*z;
end
Check whether the updated power setting is in a permitted range.
P(t,n,:)=max(P(t,n,:), 0);
S=sum(P(t,n,:));

if S>Pmax

P(t,n,:)=Pmax*P(t,n,:)/S;

end where water_filling(P(t,n,:),H) is generally referred to as a "water filling algorithm" In this case, H>0 indicates that the minimum transmission quantity is not completed. This function indicates that in a case in which data of an amount H is not completed, if power of each subband in this cell is increased to meet a requirement for completing the minimum transmission quantity, the power needs to be increased. P(t,n,s) indicates a power upper threshold, namely, power upper threshold, of a cell n in the $s^{th}$ subband at a time point t. Generally the power upper threshold is on a per-subband basis, that is, an operating band is divided into several subbands, and frequency resources in a same subband use a same power upper threshold; C(t,n) indicates a minimum transmitted data volume of the cell n at the time point t; and V(t,n) indicates an actual transmitted data volume of the cell n at the time point t.

Optionally, the adjusting unit 502 is specifically configured to:

when the cell is in the active state, acquire a difference between an actual transmitted data volume of all cells during a previous second time period and a minimum transmission requirement of all cells during the second time period;

increase the transmit power upper threshold of the cell when the actual transmitted data volume of all cells during the second time period is greater than the minimum transmission requirement of all cells during the second time period; and decrease the transmit power upper threshold of the cell when the actual transmitted data volume of all cells during the second time period is less than the minimum transmission requirement of all cells during the second time period, where the transmit power upper threshold is adjusted per frequency subband, and power upper thresholds of different frequency subbands are adjusted independently of each other.

Specifically, the decreasing the transmit power upper threshold of the cell executed in the adjusting unit 502 includes:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

Specifically, the increasing the transmit power upper threshold of the cell executed in the adjusting unit 502 includes:

for each frequency subband, a step size of adjusting the transmit power upper threshold is a penalty factor multiplied by a sum of differences between an actual transmitted data volume of all cells and the minimum transmission requirement of all cells during the second time period, where the penalty factor indicates impact on data transmission in a case in which each frequency subband is greater than a minimum transmission requirement of each subband.

In another embodiment, the base station further includes a judging unit, where the judging unit is configured to:

determine whether the actual transmitted data volume of all cells during the second time period is greater than the minimum transmission requirement of all cells during the second time period; and the judging unit is specifically configured for:

the determining whether the actual transmitted data volume of all cells during the second time period is greater than the minimum transmission requirement of all cells during the second time period includes:

multiplying the sum of differences by a preset weight to acquire a second weight value;

if the second weight value is greater than zero, determining whether the actual transmitted data volume of all cells during the second time period is greater than the minimum transmission requirement of all cells during the second time period; and if the second weight value is less than zero, determining whether the actual transmitted data volume of all cells during the second time period is less than the minimum transmission requirement of all cells during the second time period.

Specifically, reference may be made to the following implementation manner

Calculate a transmitted data volume V of all cells and a minimum transmission quantity C of all cells during a current period of T2.

Compare the transmitted data volume V with the minimum transmission quantity C.

D=W(n,:)*(C(t,:-)−V(t,:));//W is a weighting coefficient.

Calculate a step size of power adjustment.

H=D*F;

Update a power setting (power upper threshold).

if H>0 z=P(t,n,:)/sum(P(t,n,:));

P(t,n,:)=P(t,n,:)−H*z;

else

P(t,n,:)=water_filling(P(t,n,:),−H);

end

Check whether the updated power setting is in a permitted range.

P(t,n,:)=max(P(t,n,:), 0);

S=sum(P(t,n,:));

if S>Pmax

P(t,n,:)=Pmax*P(t,n,:)/S;

end where water_filling(P(t,n,:),−H) indicates that, in a case in which H is greater than 0, namely, when the actual transmitted data volume of all cells during the second time period is less than the minimum transmission requirement of all cells during the second time period, the transmit power upper threshold of this cell is decreased, so that another cell in a passive state meets the minimum transmission requirement, and so that a difference between the transmitted data volume and the minimum transmission requirement tends to be consistent between the subbands.

This embodiment of the present invention provides the base station. A centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

Figure 6:
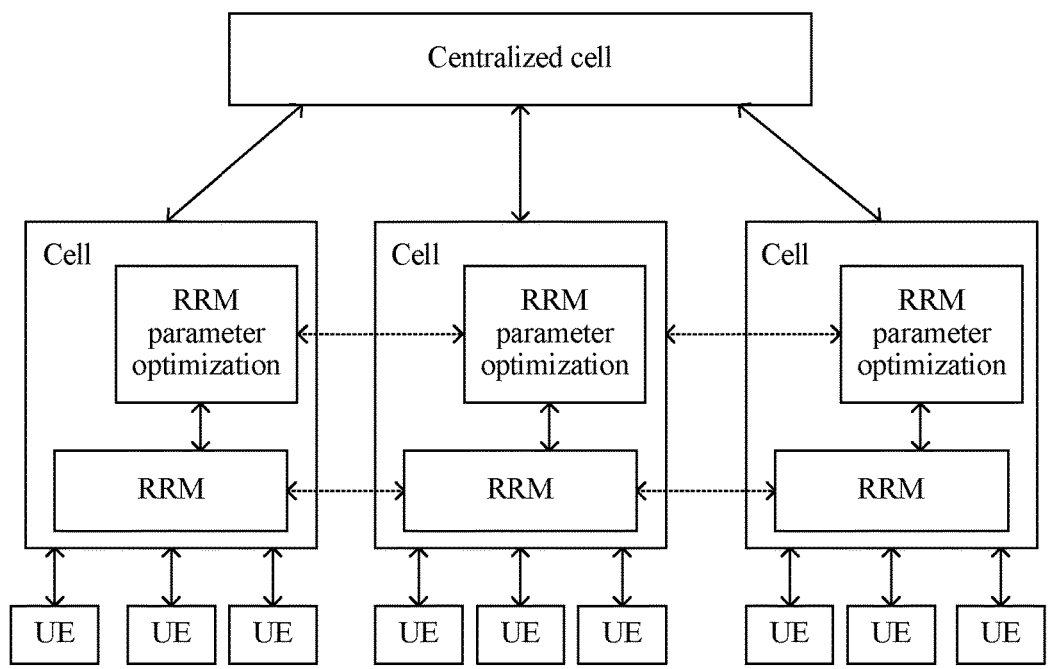
FIG. 6 is a structural diagram of a radio resource optimization and management system according to an embodiment of the present invention.

Referring to FIG. 6, FIG. 6 is a structural diagram of a radio resource optimization and management system according to an embodiment of the present invention. FIG. 6 shows centralized cell scheduling (cell manager) that performs centralized optimization decision-making, and RRM parameter optimization (RRM optimizer) that performs distributed optimization decision-making In this solution, two cell coordination states are defined, that is, an active state and a passive state. A cell in the active state adjusts an RRM parameter of this cell based on a policy of maximizing a target function of this cell, and a cell in the passive state adjusts an RRM parameter of this cell based on a policy of ensuring that a target function of this cell is not lower than a minimum requirement. By controlling a cell coordination state, a centralized controller enhances a network KPI at a relatively large time granularity (a time period of T1) while ensuring that performance of all cells is met. An adjustment period of the cell coordination state is a smaller time granularity (a time period of T2). The RRM parameter of this cell is optimized by coordinating with a neighboring cell in a current coordination state. In this embodiment, the RRM parameter refers to a power upper threshold (power upper threshold) in an operating spectrum, that is, when an RRM function of the cell (such as a scheduler and a power control module) uses a specific part of the spectrum, power cannot exceed the power upper threshold. The power upper threshold is different from an actual transmit power generated by a specific RRM module during user scheduling and power controlling. The power upper threshold is generally related to a current network status such as traffic volume distribution and a neighboring cell relationship, and needs to be adjusted according to a change of the network status, so as to obtain optimal network performance The system in this solution may directly overlay an existing system, and only an interface for parameter configuration and statistics collection exists between the system in this solution and a cell RRM module of the existing system, without changing a function of the RRM module of the existing system.

This embodiment of the present invention provides the system. A centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

Figure 7:
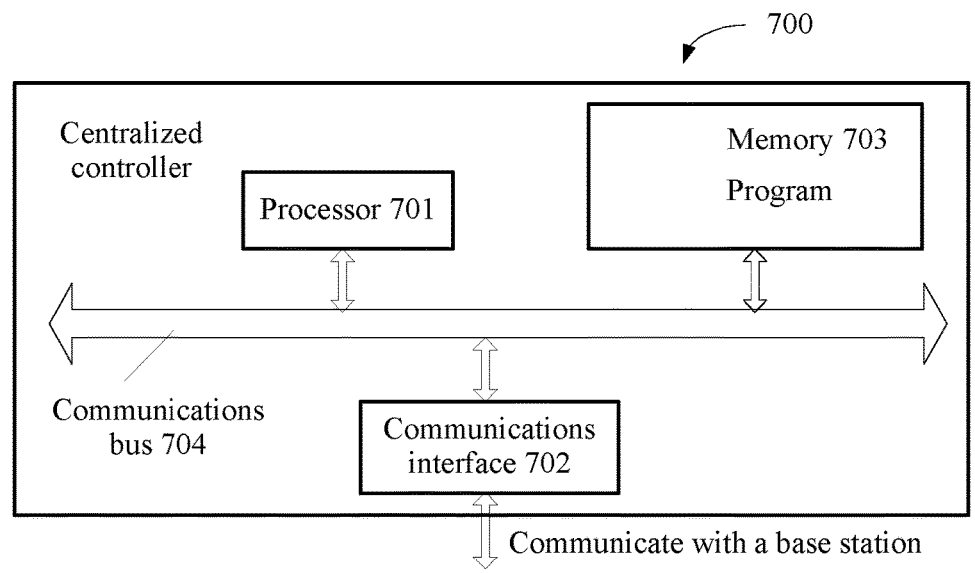
FIG. 7 is a device structure diagram of a centralized controller according to an embodiment of the present invention.

FIG. 7 is a device structure diagram of a centralized controller according to an embodiment of the present invention. Referring to FIG. 7, FIG. 7 shows a centralized controller 700 according to an embodiment of the present invention. A specific embodiment of the present invention does not impose a limitation on specific implementation of the device. The centralized controller 700 includes:

a processor (processor) 701, a communications interface (Communications Interface) 702, a memory (memory) 703, and a bus 704.

The processor 701, the communications interface 702, and the memory 703 communicate with one another by using the bus 704.

The communications interface 702 is configured to communicate with other devices.

The processor 701 is configured to execute a program.

Specifically, the program may include program code, where the program code includes a computer operation instruction.

The processor 701 may be a central processing unit (central processing unit, CPU), or an application specific integrated circuit ASIC (Application Specific Integrated Circuit), or may be configured as one or more integrated circuits that implement this embodiment of the present invention.

The memory 703 is configured to store the program. The memory 703 may be a volatile memory (volatile memory) such as a random access memory (random-access memory, RAM), or a non-volatile memory (non-volatile memory) such as a read-only memory (read-only memory, ROM), a flash memory (flash memory), a hard disk drive (hard disk drive, HDD) or a solid-state drive (solid-state drive, SSD). The processor 701 executes the following method according to program instructions stored in the memory 703:

determining a work status series and a work policy series of each cell during a first time period; and sending the work status series and the work policy series of each cell to each cell, so that each cell adjusts resources of this cell according to the work status series and the work policy series, where duration of each work status is a second time period, and a sum of all the second time periods is the first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

Before the determining a work status series and a work policy series of each cell during a first time period, the method further includes:

receiving first information sent by each cell, where the first information includes at least location information of each cell; where the determining a work status series and a work policy series of each cell during a first time period includes:

grouping all cells according to the first information so that a quantity of groups is minimal and interference caused by a cell to another cell in a same group is minimal; and determining, on a per-group basis, a work status and a work policy of each group during each second time period so that average interference received by all cells during the first time period is minimal and a minimum transmission requirement of each cell during the first time period is met.

During each second time period, a work status of only one group is an active state.

This embodiment of the present invention provides the centralized controller. The centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

Figure 8:
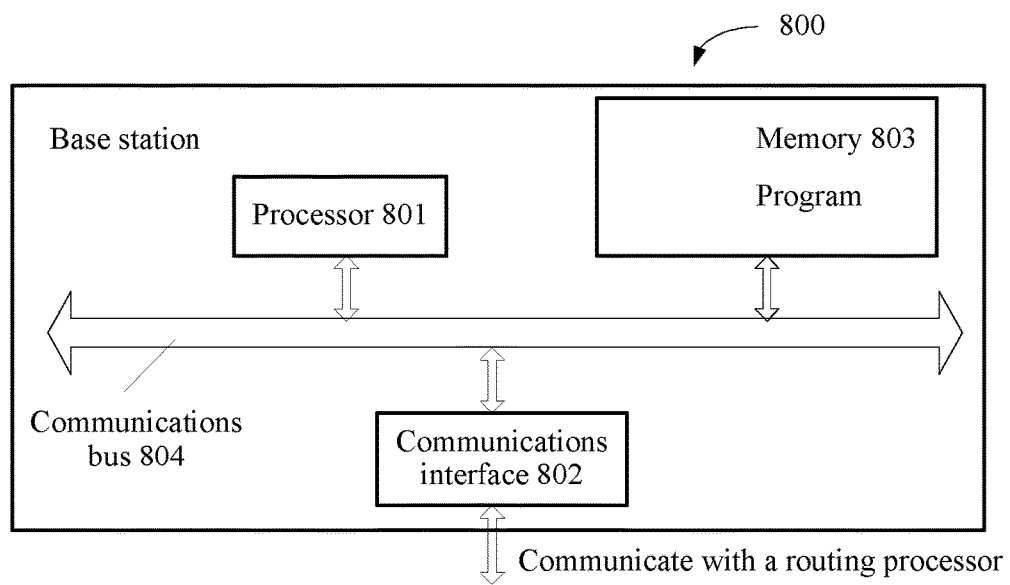
FIG. 8 is a device structure diagram of a base station according to an embodiment of the present invention.

FIG. 8 is a device structure diagram of a base station according to an embodiment of the present invention. Referring to FIG. 8, FIG. 8 shows a base station 800 according to an embodiment of the present invention. A specific embodiment of the present invention does not impose a limitation on specific implementation of the base station. The base station 800 includes:

a processor (processor) 801, a communications interface (Communications Interface) 802, a memory (memory) 803, and a bus 804.

The processor 801, the communications interface 802, and the memory 803 communicate with one another by using the bus 804.

The communications interface 802 is configured to communicate with the centralized controller.

The processor 801 is configured to execute a program.

Specifically, the program may include program code, where the program code includes a computer operation instruction.

The processor 801 may be a central processing unit (central processing unit, CPU), or an application specific integrated circuit ASIC (Application Specific Integrated Circuit), or may be configured as one or more integrated circuits that implement this embodiment of the present invention.

The memory 803 is configured to store the program. The memory 803 may be a volatile memory (volatile memory) such as a random access memory (random-access memory, RAM), or a non-volatile memory (non-volatile memory) such as a read-only memory (read-only memory, ROM), a flash memory (flash memory), a hard disk drive (hard disk drive, HDD) or a solid-state drive (solid-state drive, SSD). The processor 801 executes the following method according to program instructions stored in the memory 803:

receiving a work status series and a work policy series sent by a centralized controller; and adjusting a transmit power upper threshold of a cell according to the work status series and the work policy series, where an adjustment period is a third period, duration of each work status is a second time period, a sum of all the second time periods is the first time period, and a sum of the adjustment periods is the second time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series includes a work status of each cell during each second time period in the first time period, and the work policy series includes a work policy of each cell during each second time period in the first time period.

The adjusting a transmit power upper threshold of a cell according to the work status series and the work policy series includes:

acquiring an actual transmitted data volume during the previous second time period when the cell is in the passive state;

increasing the transmit power upper threshold of the cell if the actual transmitted data volume during the second time period is less than a minimum transmission requirement during the second time period; and decreasing the transmit power upper threshold of the cell if the actual transmitted data volume is greater than the minimum transmission requirement, where the transmit power upper threshold is adjusted per frequency subband, and power upper thresholds of different frequency subbands are adjusted independently of each other.

The increasing the transmit power upper threshold of the cell includes:

for each frequency subband, a step size of adjusting the transmit power upper threshold is a penalty factor multiplied by an absolute value of a difference between the actual transmitted data volume and the minimum transmission requirement, where the penalty factor indicates impact on data transmission in a case in which each frequency subband does not meet a minimum transmission requirement of each subband.

The decreasing the transmit power upper threshold of the cell includes:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

After the acquiring an actual transmitted data volume during the previous second time period when the cell is in the passive state, the method further includes:

determining whether the actual transmitted data volume during the second time period is less than the minimum transmission requirement during the second time period; and the determining whether the actual transmitted data volume during the second time period is less than the minimum transmission requirement during the second time period includes:

subtracting the minimum transmission requirement from the actual transmitted data volume during the second time period to acquire a difference;

acquiring a first weight value according to the difference and a preset weight;

when the first weight value is greater than zero, determining whether the actual transmitted data volume during the second time period is greater than the minimum transmission requirement during the second time period; and when the first weight value is less than zero, determining whether the actual transmitted data volume during the second time period is less than the minimum transmission requirement during the second time period.

The adjusting a transmit power upper threshold of a cell according to the work status series and the work policy series includes:

when the cell is in the active state, acquiring a difference between an actual transmitted data volume of all cells during a previous second time period and a minimum transmission requirement of all cells during the second time period;

increasing the transmit power upper threshold of the cell when the actual transmitted data volume of all cells during the second time period is greater than the minimum transmission requirement of all cells during the second time period; and decreasing the transmit power upper threshold of the cell when the actual transmitted data volume of all cells during the second time period is less than the minimum transmission requirement of all cells during the second time period, where the transmit power upper threshold is adjusted per frequency subband, and power upper thresholds of different frequency subbands are adjusted independently of each other.

The decreasing the transmit power upper threshold of the cell includes:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

The increasing the transmit power upper threshold of the cell includes:

for each frequency subband, a step size of adjusting the transmit power upper threshold is a penalty factor multiplied by a sum of differences between an actual transmitted data volume of all cells and the minimum transmission requirement of all cells during the second time period, where the penalty factor indicates impact on data transmission in a case in which each frequency subband is greater than a minimum transmission requirement of each subband.

After the acquiring the sum of differences between the actual transmitted data volume of all cells during the previous second time period and the minimum transmission requirement of all cells during the second time period, the method further includes:

determining whether the actual transmitted data volume of all cells during the second time period is greater than the minimum transmission requirement of all cells during the second time period; and the determining whether the actual transmitted data volume of all cells during the second time period is greater than the minimum transmission requirement of all cells during the second time period includes:

multiplying the sum of differences by a preset weight to acquire a second weight value;

if the second weight value is greater than zero, determining whether the actual transmitted data volume of all cells during the second time period is greater than the minimum transmission requirement of all cells during the second time period; and if the second weight value is less than zero, determining whether the actual transmitted data volume of all cells during the second time period is less than the minimum transmission requirement of all cells during the second time period.

This embodiment of the present invention provides the base station. A centralized controller determines a work status series and a work policy series of each cell during a first time period, and sends the work status series and the work policy series of each cell to each cell, so that each cell adjusts resources of this cell according to the work status series and the work policy series, thereby enhancing a network KPI at a large time granularity by means of distributed cell coordination while ensuring local KPI performance of each cell. In contrast with distributed coordination optimization in a single coordination state, the present invention provides a higher degree of freedom in terms of a time dimension, and therefore provides better performance in terms of a network KPI at a large time granularity.

The foregoing descriptions are merely implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method of radio resource optimization and management, comprising:

receiving a work status series and a work policy series sent by a centralized controller; and adjusting a transmit power upper threshold of a cell according to the work status series and the work policy series, wherein a duration of each work status is a second time period, a sum of all second time periods is first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series comprises a work status of each cell during each second time period in the first time period, and the work policy series comprises a work policy of each cell during each second time period in the first time period;

wherein the adjusting a transmit power upper threshold of a cell according to the work status series and the work policy series comprises:

determining the work status of the cell according to the work status series and the work policy series;

acquiring an actual transmitted data volume during a previous second time period when the cell is in the passive state;

increasing the transmit power upper threshold of the cell when the actual transmitted data volume during the second time period is less than a minimum transmission requirement during the second time period; and decreasing the transmit power upper threshold of the cell when the actual transmitted data volume is greater than the minimum transmission requirement, wherein the transmit power upper threshold is adjusted per frequency subband, and power upper thresholds of different frequency subbands are adjusted independently of each other.

2. The method according to claim 1, wherein when the actual transmitted data volume during the second time period is less than a minimum transmission requirement during the second time period, the increasing the transmit power upper threshold of the cell comprises:

for each frequency subband, a step size of adjusting the transmit power upper threshold is a penalty factor multiplied by an absolute value of a difference between the actual transmitted data volume and the minimum transmission requirement, wherein the penalty factor indicates impact on data transmission when each frequency subband does not meet a minimum transmission requirement of each subband.

3. The method according to claim 1, wherein after the acquiring an actual transmitted data volume during the previous second time period when the cell is in the passive state, the method further comprises:

determining whether the actual transmitted data volume during the second time period is less than the minimum transmission requirement during the second time period; and the determining whether the actual transmitted data volume during the second time period is less than the minimum transmission requirement during the second time period comprises:

subtracting the minimum transmission requirement from the actual transmitted data volume during the second time period to acquire a difference;

acquiring a first weight value according to the difference and a preset weight;

when the first weight value is greater than zero, determining whether the actual transmitted data volume during the second time period is greater than the minimum transmission requirement during the second time period; and when the first weight value is less than zero, determining whether the actual transmitted data volume during the second time period is less than the minimum transmission requirement during the second time period.

4. A method of radio resource optimization and management, comprising:

receiving a work status series and a work policy series sent by a centralized controller; and adjusting a transmit power upper threshold of a cell according to the work status series and the work policy series, wherein a duration of each work status is a second time period a sum of all second time periods is first time period;

a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series comprises a work status of each cell during each second time period in the first time period, and the work policy series comprises a work policy of each cell during each second time period in the first time period;

wherein the adjusting a transmit power upper threshold of a cell according to the work status series and the work policy series comprises:

determining the work status of the cell according to the work status series and the work policy series;

when the cell is in the active state, acquiring a difference between an actual transmitted data volume of all cells during a previous second time period and a minimum transmission requirement of all cells during the second time period;

increasing the transmit power upper threshold of the cell when the actual transmitted data volume of all cells during the second time period is greater than the minimum transmission requirement of all cells during the second time period; and decreasing the transmit power upper threshold of the cell when the actual transmitted data volume of all cells during the second time period is less than the minimum transmission requirement of all cells during the second time period, wherein the transmit power upper threshold is adjusted per frequency subband, and power upper thresholds of different frequency subbands are adjusted independently of each other.

5. The method according to claim 4, wherein when the actual transmitted data volume of all cells during the second time period is less than the minimum transmission requirement of all cells during the second time period, the decreasing the transmit power upper threshold of the cell comprises:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

6. The method according to claim 4, wherein after the acquiring the sum of differences between the actual transmitted data volume of all cells during the previous second time period and the minimum transmission requirement of all cells during the second time period, the method further comprises:

determining whether the actual transmitted data volume of all cells during the second time period is greater than the minimum transmission requirement of all cells during the second time period; and the determining whether the actual transmitted data volume of all cells during the second time period is greater than the minimum transmission requirement of all cells during the second time period comprises:

multiplying the sum of differences by a preset weight to acquire a second weight value;

when the second weight value is greater than zero, determining whether the actual transmitted data volume of all cells during the second time period is greater than the minimum transmission requirement of all cells during the second time period; and when the second weight value is less than zero, determining whether the actual transmitted data volume of all cells during the second time period is less than the minimum transmission requirement of all cells during the second time period.

7. A base station comprising:

a memory to store instructions; and a processor to execute the instructions to configure the base station to:

receive a work status series and a work policy series sent by a centralized controller; and adjust a transmit power upper threshold of a cell according to the work status series and the work policy series, wherein a duration of each work status is a second time period, a sum of all the second time periods is the first time period, a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series comprises a work status of each cell during each second time period in the first time period, and the work policy series comprises a work policy of each cell during each second time period in the first time period;

wherein the processor further executes the instructions to configure the base station to:

determine the work status of the cell according to the work status series and the work policy series acquire an actual transmitted data volume during a previous second time period when the cell is in the passive state;

increase the transmit power upper threshold of the cell when the actual transmitted data volume during the second time period is less than a minimum transmission requirement during the second time period; and decrease the transmit power upper threshold of the cell when the actual transmitted data volume is greater than the minimum transmission requirement, wherein the transmit power upper threshold is adjusted per frequency subband, and power upper thresholds of different frequency subbands are adjusted independently of each other.

8. The base station according to claim 7, wherein when the actual transmitted data volume during the second time period is less than a minimum transmission requirement during the second time period, the increasing the transmit power upper threshold of the cell executed in the base station comprises:

for each frequency subband, a step size of adjusting the transmit power upper threshold is a penalty factor multiplied by an absolute value of a difference between the actual transmitted data volume and the minimum transmission requirement, wherein the penalty factor indicates impact on data transmission in a case in which each frequency subband does not meet a minimum transmission requirement of each subband.

9. The base station according to claim 7, wherein the processor further executes the instructions to configure the base station to:

determine whether the actual transmitted data volume during the second time period is less than the minimum transmission requirement during the second time period;

subtract the minimum transmission requirement from the actual transmitted data volume during the second time period to acquire a difference;

acquire a first weight value according to the difference and a preset weight;

when the first weight value is greater than zero, determine whether the actual transmitted data volume during the second time period is greater than the minimum transmission requirement during the second time period; and when the first weight value is less than zero, determine whether the actual transmitted data volume during the second time period is less than the minimum transmission requirement during the second time period.

10. A base station comprising:
a memory to store instructions; and
a processor to execute the instructions to configure the base station to:
receive a work status series and a work policy series sent by a centralized controller; and
adjust a transmit power upper threshold of a cell according to the work status series and the work policy series, wherein
a duration of each work status is a second time period, a sum of all the second time periods is the first time period, a work status of the cell is an active state or a passive state, a work policy of a cell in the passive state is to adjust power to meet a minimum transmission requirement of the cell, and a work policy of a cell in the active state is to maximize a transmission rate of the cell on a basis that the cell in the passive state meets the minimum transmission requirement of each cell in the passive state; and the work status series comprises a work status of each cell during each second time period in the first time period, and the work policy series comprises a work policy of each cell during each second time period in the first time period;

wherein the processor further executes the instructions to configure the base station to:

determine the work status of the cell according to the work status series and the work policy series;

when the cell is in the active state, acquire a difference between an actual transmitted data volume of all cells during a previous second time period and a minimum transmission requirement of all cells during the second time period;

increase the transmit power upper threshold of the cell when the actual transmitted data volume of all cells during the second time period is greater than the minimum transmission requirement of all cells during the second time period; and decrease the transmit power upper threshold of the cell when the actual transmitted data volume of all cells during the second time period is less than the minimum transmission requirement of all cells during the second time period, wherein the transmit power upper threshold is adjusted per frequency subband, and power upper thresholds of different frequency subbands are adjusted independently of each other.

11. The base station according to claim 10, wherein when the actual transmitted data volume of all cells during the second time period is less than the minimum transmission requirement of all cells during the second time period, the decreasing the transmit power upper threshold of the cell executed in the base station comprises:

for each frequency subband, adjusting power upper thresholds between different frequency subbands so that a sum of power upper thresholds of all frequency subbands is not greater than a sum of power upper thresholds of all frequency subbands before adjustment, and so that a difference between the transmitted data volume and the minimum transmission requirement tends to be consistent between the subbands.

12. The base station according to claim 10, wherein the processor further executions the instructions to configure the base station to:

determine whether the actual transmitted data volume of all cells during the second time period is greater than the minimum transmission requirement of all cells during the second time period; and multiply the sum of differences by a preset weight to acquire a second weight value;

when the second weight value is greater than zero, determine whether the actual transmitted data volume of all cells during the second time period is greater than the minimum transmission requirement of all cells during the second time period; and when the second weight value is less than zero, determine whether the actual transmitted data volume of all cells during the second time period is less than the minimum transmission requirement of all cells during the second time period.

13. The method according to claim 1, wherein an adjustment period is a third period of adjusting transmit power upper threshold of a cell according to the work status series and the work policy series, and a sum of adjustment periods is the second time period.

14. The base station according to claim 7, wherein an adjustment period is a third period of adjusting transmit power upper threshold of a cell according to the work status series and the work policy series, and a sum of adjustment periods is the second time period.

15. The method according to claim 4, wherein an adjustment period is a third period of adjusting transmit power upper threshold of a cell according to the work status series and the work policy series, and a sum of adjustment periods is the second time period.

16. The base station according to claim 10, wherein an adjustment period is a third period of adjusting transmit power upper threshold of a cell according to the work status series and the work policy series, and a sum of adjustment periods is the second time period.

17. The method according to claim 1, wherein when the actual transmitted data volume is greater than the minimum transmission requirement, the decreasing the transmit power upper threshold of the cell comprises:

adjusting the transmit power upper threshold between different frequency subbands during a same second time period so that a sum of power upper thresholds of all frequency subbands during a same period is not greater than a sum of power upper thresholds of all frequency subbands before adjustment, and so that a difference between the transmitted data volume and the minimum transmission requirement tends to be consistent between the subbands.

18. The method according to claim 4, wherein when the actual transmitted data volume of all cells during the second time period is greater than the minimum transmission requirement of all cells during the second time period, the increasing the transmit power upper threshold of the cell comprises:

for each frequency subband, a step size of adjusting the transmit power upper threshold is a penalty factor multiplied by a sum of differences between an actual transmitted data volume of all cells and the minimum transmission requirement of all cells during the second time period, wherein the penalty factor indicates impact on data transmission in a case in which each frequency subband is greater than a minimum transmission requirement of each subband.

19. The base station according to claim 7, wherein when the actual transmitted data volume is greater than the minimum transmission requirement, the decreasing the transmit power upper threshold of the cell executed in the base station comprises:

adjusting the transmit power upper threshold between different frequency subbands during a same second time period so that a sum of power upper thresholds of all frequency subbands during the same period is not greater than a sum of power upper thresholds of all frequency subbands before adjustment, and so that a difference between the transmitted data volume and the minimum transmission requirement tends to be consistent between the subbands.

20. The base station according to claim 10, wherein when the actual transmitted data volume of all cells during the second time period is greater than the minimum transmission requirement of all cells during the second time period, the increasing the transmit power upper threshold of the cell executed in the base station comprises:

for each frequency subband, a step size of adjusting the transmit power upper threshold is a penalty factor multiplied by a sum of differences between an actual transmitted data volume of all cells and the minimum transmission requirement of all cells during the second time period, wherein the penalty factor indicates impact on data transmission in a case in which each frequency subband is greater than a minimum transmission requirement of each subband.

* * * * *